United States Patent Office 3,149,238
Patented Sept. 15, 1964

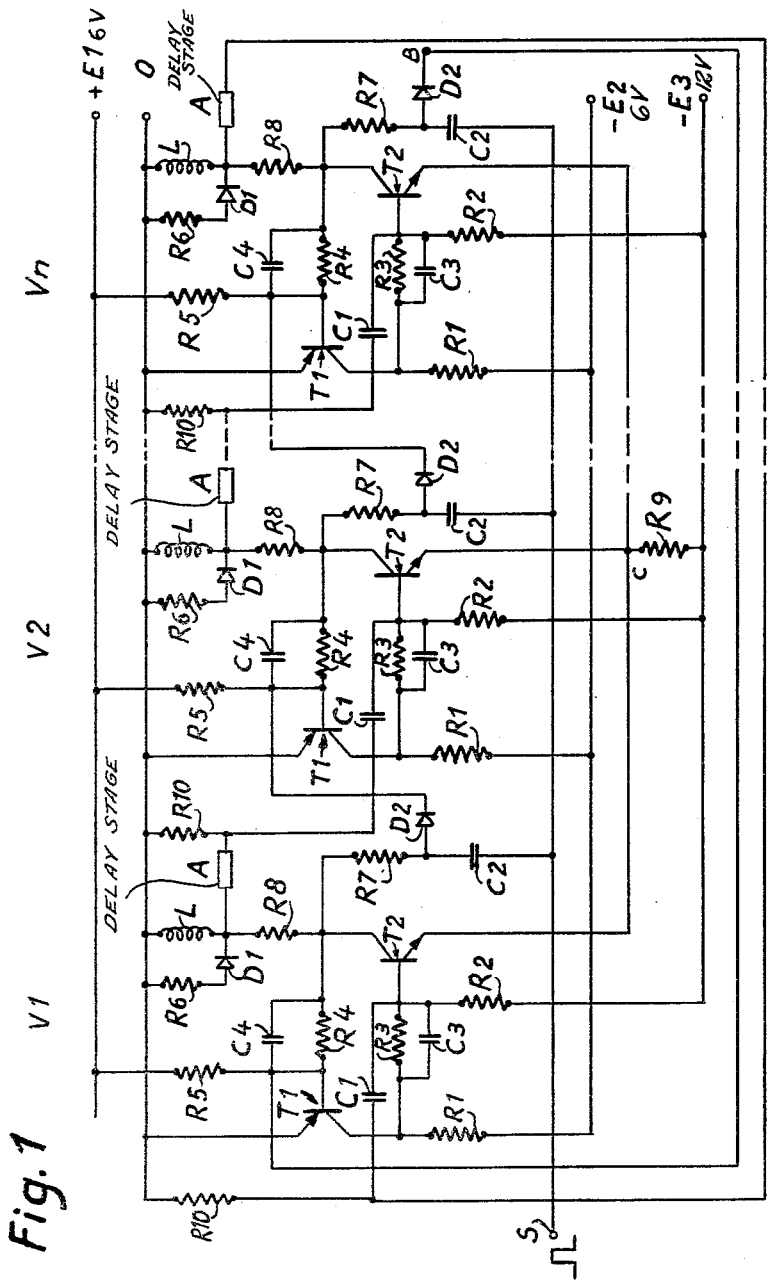

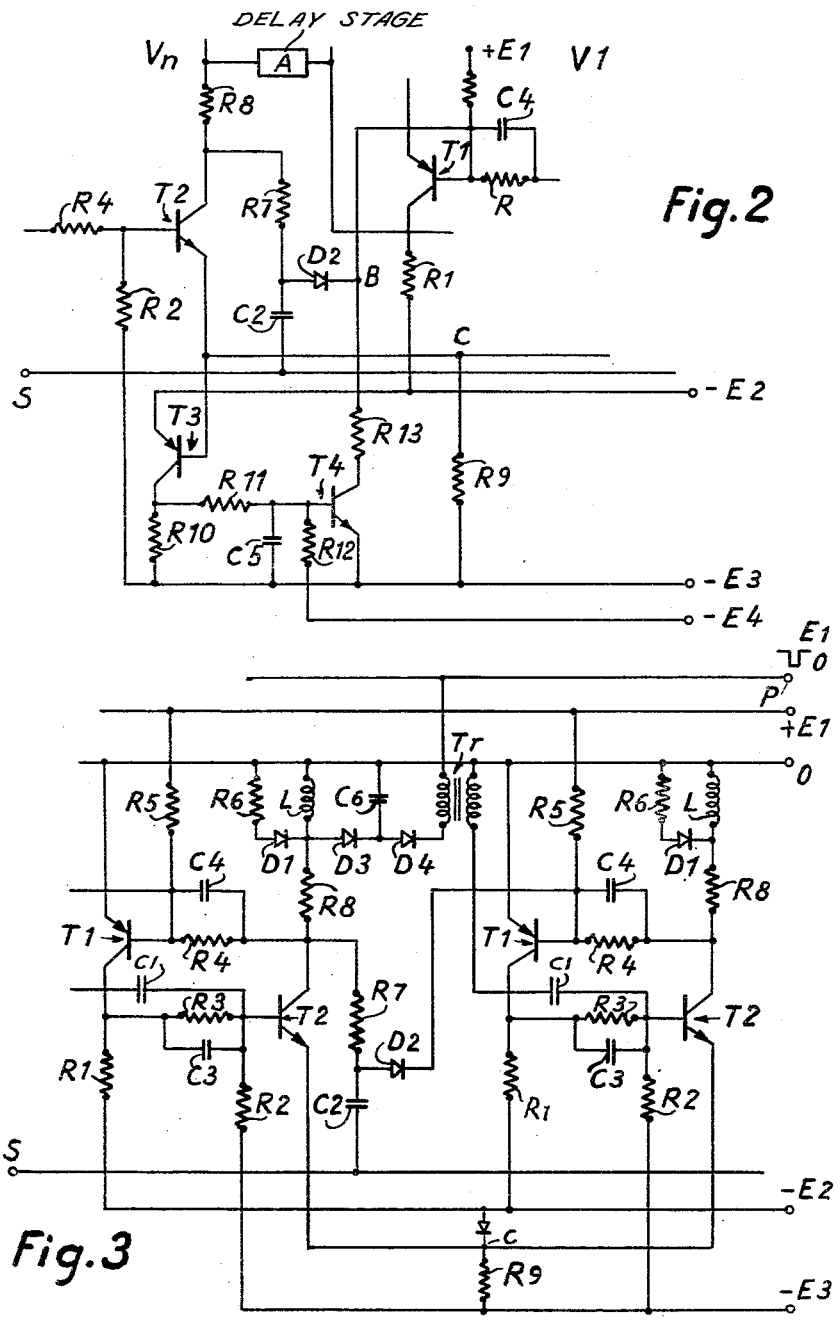

3,149,238
RING-COUNTER CIRCUIT SYSTEM
György Szarvas, Stuvsta, and Øyvind Gjessvåg, Hagersten, Sweden, assignors to Telefonaktiebolaget L M Ericsson, Stockholm, Sweden, a corporation of Sweden
Filed Feb. 25, 1960, Ser. No. 11,093
Claims priority, application Sweden Feb. 27, 1959
8 Claims. (Cl. 307—88.5)

The present invention refers to an electrical circuit arrangement for step-by-step progressing of an information along a chain consisting of a plurality of stages by means of impulses fed to the chain.

It is known to use in counters, impulse distributors, shift registers and the like, bistable circuits comprising electronic tubes or transistors, which are connected in a chain, in order to produce such step-by-step progressing. The chain is supplied with stepping pulses restoring operative bistable circuits to inoperative condition and upon said restoring an impulse is generated which is transmitted to the next bistable circuit as an igniting pulse. In certain cases it is desirable to have a time interval between the releasing of a bistable circuit and the operation of the succeeding bistable circuit which may be carried out for example by means of a delay network. It may hereby occur that the amplitude of the impulse which is generated when a bistable circuit is restored, becomes too weak before reaching the following bistable circuit. This disadvantage may be avoided by the arrangement according to this invention which refers to an electrical circuit arrangement for step-by-step progressing of an information along a chain consisting of a plurality of bistable circuits by means of stepping pulses fed to the bistable circuit, each bistable circuit being provided with a first input, fed by said impulses, for restoring the bistable circuit to inoperative condition, and with a second input which is connected to an output on the preceding bistable circuit in the chain in such manner that a switching pulse is obtained when the preceding bistable circuit is restored. The circuit arrangement is characterized by the fact that said input is connected to an inductive circuit in the bistable circuit, through which in the operative condition of the bistable circuit a current is flowing which is rapidly interrupted when the bistable circuit is restored to inoperative condition, and causes a strong voltage impulse on the output of the bistable circuit.

The invention will be described more in detail with reference to the enclosed drawing, in which FIG. 1 shows an embodiment of a chain according to the invention, FIG. 2 shows an improvement of a detail of the chain according to FIG. 1, and FIG. 3 shows a modification of the chain according to FIG. 1.

The chain according to FIG. 1 includes a number of bistable circuits V1, V2 ... Vn of the so-called hook-type, each comprising a pnp-transistor T1 and a npn-transistor T2. The chain is progressed by means of an impulse source producing positive impulses and connected to the input S. The chain is supplied by a current source having an earthed terminal (0), a terminal +E1 which is positive relatively to earth (for example +6 v.), and two negative terminals —E2 and —E3 (for example —6v. and —12v. respectively).

In each bistable circuit the base of the pnp-transistor T1 is through a base impedance R4, C4 connected to the collector of the npn-transistor T2, while the base of the transistor T2 is through a base impedance R3, C3 connected to the collector of the transistor T1. The emitter of the transistor T1 is connected to earth, while the collector is connected to the terminal —E2 through the resistance R1 besides to the base impedance R3, C3. The base of the transistor T1 is connected furthermore on one hand to the terminal +E1 through the resistance R5, on the other hand through the diode D2 and the capacitor C2 to the input S intended for the stepping pulses. The emitters of the transistors T2 in every stage are interconnected and connected to a terminal —E3 through a common emitter resistance R9. The collector of the transistor T2 is connected to earth through the resistance R8 and an inductance L shunted by a series circuit which consists of the diode D1 and the resistance R6. The inductance is shunted also by a damping resistance R10. The collector is furthermore connected to the connecting point between the capacitor C2 and the diode D2 through the resistance R7. The connecting point between L and R8 is connected to the base of the transistor T2 in the following bistable circuit through a capacitor C1. The last bistable circuit Vn is connected with the first bistable circuit V1 so that the chain forms a closed ring.

The interconnection of collectors and base electrodes in a bistable circuit has the consequence that, if one transistor becomes conducting, the potential change of the collector of this transistor will be transmitted to the base of the other transistor in such a phase that also this transistor becomes conducting. The potential change of the collector of the latter transistor is fed back in its turn to the base of the first transistor so that the latter becomes still more conducting and so on, until switching occurs to a condition, in which both transistors are conducting. In all stages the pnp-transistors T1 are normally blocked owing to the fact that the base has a potential which is positive relatively to the emitter. The base of the npn-transistors T2 has in the moment of connection a higher potential than the emitter, i.e. all transistors tend to conduct. The break out resistance R9 connected between the emitters and the terminal —E3 is however so great that only one of the bistable circuits can be conducting at the moment. The bistable circuit which has the best operating time will thus be made conducting while the others remain in inoperative condition with both transistors blocked. The collector of the transistor T1 in the conducting bistable circuit has a potential near to 0, and for this reason the emitter potential of the transistor T2 may be allowed to rise considerably above the potential —E2. The emitter-base circuits of the other bistable circuits are therefore effectively blocked. By providing one of the bistable circuits, for example V1, with a better operating time than the other bistable circuits of the chain it may be achieved that this stage always becomes conducting when connecting the arrangement to the current source.

A bistable circuit which is conducting is defined to be in "1"-position while a non-conducting bistable circuit is defined to be in "0"-position. The stepping of the "1"-position along the chain is carried out by means of positive pulses applied to the input S. These pulses are transmitted through the capacitor C2 and the diode D2 to the base of the transistor T1 in every stage except that one which follows immediately after the stage which is for the moment in the "1"-position. The conducting bistable circuit will thus be cut off and the collector current to the transistor T2 through the inductance L ceases. The magnetic energy stored in the inductance L produces a counter-electromotive force across the inductance, which through the capacitor C1 is transmitted to the base of the transistor T2 in the succeeding bistable circuit in the form of a positive igniting pulse. The transistor T2 and consequently also the transistor T1 become conducting and the bistable circuit is brought to the "1"-position. By shunting the inductance L with the diode D1 and the resistance R6 is prevented that the whole battery voltage will be applied on the inductance in the moment when the transistor T2 becomes conducting. Thus the process upon switching the bistable circuit will not differ appreciably from the switching process in a normal bistable circuit of this type. The controlling impulse to the next bistable circuit in the chain, which arises across the inductance L, when the bistable circuit is again in 0-position, will not be damped by this shunt as the diode is blocking in this case. On the other hand the resistance R10 damps in the inductance critically in order not to render again the switched bistable circuit non-conducting.

By connecting the common point between the capacitor C2 and the diode D2 to the collector of the transistor T2 in the preceding stage through the resistance R7 the capacitor C2 will be charged to the collector potential of this transistor. When the bistable circuit is in conducting state, the capacitor is charged consequently to a potential of such value that the diode obtains a blocking voltage which is higher than the amplitude of the impulse applied to S. Thus this impulse will not reach the bistable circuit which is to be brought to "1"-position and thus it cannot counteract the switching. On the other hand the impulse can reach all bistable circuits following a bistable circuit which is in "0" position, as the diode of these bistable circuits does not obtain any appreciable blocking voltage.

If a time interval is required between bringing a bistable circuit to "0"-position and bringing the succeeding bistable circuit to "1"-position, a delay conductor may be introduced at A in FIG. 1, which conductor delays the impulse generated across the inductance L. In this case also the resistance R10 is functioning as a terminating resistance for the delay conductor. As every bistable circuit has to be in an "0"-position during the delay time, it must be prevented that the potential of the point C common for the emitters of all the transistors T2, during this time decreases so much that some of the bistable circuits becomes conducting. This drawback may be eliminated by connecting between the terminal —E2 and the point C a diode directioned in such manner that it is blocked when any bistable circuit is conducting (see FIG. 3). If none of the bistable circuits is conducting, the diode becomes conducting and the potential of the point C is fixed at the potential value —E2 and inadvertent switching is prevented. This circuit has however the drawback that the starting of the chain when connecting up the working voltages becomes more difficult and if a stepping impulse would be lost, so that no bistable circuit is operated, when the interval is terminated, the chain cannot start again without external influence. This may be avoided by providing the chain with a starting device according to FIG. 2 where the diode has been replaced by the base emitter diode of a transistor T3.

The starting device comprises a first transistor T3, the base circuit of which is connected to point C in FIG. 1 and consequently is supplied with the emitter voltage of the transistors T2, while the emitter of T3 is connected to the terminal —E2, furthermore an integration network R11, C5, connected to the collector circuit of the transistor T3, and a transistor T4 controlled by the voltage obtained from the integration circuit, the collector circuit of the transistor T4 being connected to the base of the transistor T1 in that of the bistable circuits which is intended first to become conducting when connecting up to current source or if the stepping would cease for some reason.

Upon connecting up the chain, a circuit is completed from the terminal —E2 through the emitter-base circuit of the transistor T3, the point C and the common emitter-resistance R9 to the terminal —E3. The transistor becomes conducting, the collector potential rises approximately to —E2 and the capacitor C5 of the integration network begins to be charged. The time constant for the components C5, R11 of the integration network is chosen in such manner that the voltage across the capacitor and consequently the base potential of the transistor T4 will be increased to the value at which the transistor T4 becomes conducting, after a time somewhat greater than the interval between the restoring of a bistable circuit to inoperative state and the activating of the succeeding bistable circuit. When the transistor T4 becomes conducting, the base potential of the transistor T1 in the bistable circuit V2 will decrease so much that this bistable circuit becomes conducting and the chain is ready for progressing. The potential of point C rises above —E2 whereby the transistors T3 and T4 are blocked and the capacitor C5 is discharged. When the bistable circuit V2 is blocked by the next impulse on the input S, the transistor T3 will again become conducting, as now no bistable circuit is conducting. The capacitor C5 begins again to be charged, but before the voltage across the same has increased so much that the transistor T4 becomes conducting, the stepping pulse delayed through the delay network A, has reached the base of the transistor T1 in the succeeding stage which becomes conducting and interrupts the charging of the capacitor C5 by cutting off the transistor T3.

If on the other hand the stepping pulse would get lost so that the succeeding bistable circuit does not become conducting, the capacitor C5 may be charged to so high potential that the transistor T4 becomes conducting again and it produces a negative pulse which renders the bistable circuit V1 conducting again, so that a stepping process may be started again.

FIG. 3 shows a modification of the connection between the bistable circuits where the conducting bistable circuit is cut off by an impulse received on the output S in the same way as is shown in FIG. 1 while the delay of the trigger impulse generated by the cutting off, is obtained by storing the impulse energy in a capacitor, from which, after a required delay time, it is transmitted to the succeeding bistable circuit by means of a special transmission impulse. The maximum delay time is defined by the inverse resistance of the diodes D3 and D4.

In the circuit shown in FIG. 3 the inductance L is shunted by the capacitor C6 in series with the diode D3. The diode D3 is so directed that when the voltage across the inductance L rises, the capacitor C6 whill be charged through the diode to a voltage having its value between +E1 and 0. The connecting point between the diode D3 and the capacitor C6 is through a diode D4 and the primary winding of a transformer Tr connected to the input P for impulses which control the delay between the restoring of a bistable circuit to inoperative state and the activating of the next bistable circuit. The input P has a rest voltage +E1 and the amplitude of the negative impulses obtains earth potential. Thus the diode D4 is normally blocked and for this reason the capacitor C6, after being charged by the inductive voltage impulse across L, remains charged, until the negative impulse appears at P when it is discharged through the primary winding of the transformer Tr. The secondary winding of the transformer Tr is connected between earth and the base of the transistor T2 in the succeeding bistable circuit in such a way that a positive impulse is obtained on the base of the transistor T2 and renders the bistable circuit conducting when the capacitor C6 is discharged.

The pulse input P is common for all the bistable circuits but in those stages which are not brought to "0"-position by the next preceding impulse on the input S, the capacitor C6 has no energy stored. Thus when the transmission impulse P is received, no signal will arise across the secondary winding of the transformer Tr and the following bistable circuit remains in "0"-position.

We claim:

1. A ring-counter circuit system comprising a plurality of interconnected bistable circuits forming a chain for step-by-step progressing of an information signal, a source of blocking pulses for restoring conducting ones of said bistable circuits to a non-conducting state, an energy storing inductance means connected to each of said bistable circuits and current flowing therethrough when said bistable circuits are conducting, a first input circuit connected to each of said bistable circuits including a rectifier, said source being connected to said first input circuit of each of said bistable circuits, one of said bistable circuits being responsive to said signals for conducting before the other of said bistable circuits, a second input circuit connected to each of said bistable circuits including said inductance means connected to a preceding one of said bistable circuits, said rectifiers being connected to a preceding bistable circuit and being blocked when said preceding bistable circuit is conducting, each of said blocked rectifiers preventing said blocking pulses from being applied to said first input circuit of a succeeding bistable circut, delay circuit means connected between said second input circuit and said inductance means to delay for a predetermined period of time current pulses generated in said inductance means when said bistable circuit connected thereto becomes blocked from being applied to said succeeding bistable circuit, and means connected to each of said bistable circuits and responsive to the conduction of one of said bistable circuits for allowing a selected bistable circuit to become conducting during the blocked condition of said bistable circuits.

2. A ring-counter circuit system comprising a plurality of interconnected bistable circuits forming a chain for step-by-step progressing of an information signal, a source of stepping blocking pulses for restoring conducting ones of said bistable circuits to a non-conducting state, an energy storing inductance circuit connected to each of said bistable circuits and current flowing therethrough when said bistable circuits are conducting, a first input circuit connected to each of said bistable circuits including a capacitor and a rectifier connected in series, said source being connected to said first input circuit of each of said bistable circuits, one of said bistable circuits being responsive to said pulses for conducting before the other of said bistable circuits, a second input circuit connected to each of said bistable circuits including said inductance circuit connected to a preceding one of said bistable circuits, said rectifiers being connected to a preceding bistable circuit and being blocked when said preceding circuit is conducting, each of said blocked rectifiers preventing said blocking pulses from being applied to said first input circuit of a succeeding bistable circuit, delay circuit means connected between said second input circuit and said inductance circuit to delay for a predetermined period of time current pulses generated in said inductance means when said bistable circuit connected thereto becomes blocking from being applied to said succeeding bistable circuit, and means connected to each of said bistable circuits and responsive to the conduction of one of said bistable circuits for allowing a selected bistable circuit to become conducting in the blocked condition of said bistable circuits upon expiration of the delay time of said delayed current pulses.

3. A circuit system according to claim 1, wherein said means permitting one selected bistable circuit to become conductive includes a resistance connected to a common current supply circuit for each of said bistable circuits to prevent others of said bistable circuits from conducting after a succeeding bistable circuit becomes conducting.

4. A circuit system according to claim 2, wherein said means permitting one selected bistable circuit to become conductive includes a resistance connected to a common current feeding circuit for each of said bistable circuits and a rectifier connected between said resistance and a fixed voltage potential having a value selected to block said rectifier when at least one of said bistable circuits is conductive and until others of said bistable circuits are non-conducting.

5. A circuit system according to claim 1, wherein said means permitting one selected bistable circuit to become conductive includes a resistance connected between a common feeding circuit for said bistable circuits and a fixed voltage potential for biasing said bistable circuits non-conducting as a succeeding one of said bistable circuits becomes conducting with said delayed pulse, and a starting circuit connected to said one responsive bistable circuit and to said fixed voltage potential and responsive to current flowing in said common feeding circuit for energizing said one responsive bistable circuit to become conducting when a succeeding bistable circuit is non-conducting.

6. A circuit system according to claim 1 in which said means for delaying said activating pulse on said second input, comprise a capacitor charged by the voltage impulse across the inductive circuit and a transformer having its primary winding supplied by the discharge of said capacitor and its secondary winding connected to said second input of the subsequent bistable circuit.

7. A circuit system according to claim 1, wherein each of said bistable circuits includes two transistors, each having base, collector and emitter electrodes, said base and collector electrodes of one of said transistors being connected respectively to said collector and base electrodes of another of said transistors, a source of voltage potential connected to some of said electrodes for biasing said transistors normally in a non-conducting state.

8. A circuit system according to claim 2, wherein each of said bistable circuits includes two transistors each having base, collector and emitter electrodes, said base and collector electrodes of one of said transistors being connected respectively to said collector and base electrodes of another of said transistors, a source of voltage potential connected to some of said electrodes for biasing said transistors normally into a non-conducting state, said collector of said other of said transistors being connected to said inductance means, said rectifier being connected to said collector of said other of said transistors.

References Cited in the file of this patent
UNITED STATES PATENTS

| | | |
|---|---|---|
| 2,832,541 | Guttridge | Apr. 29, 1958 |
| 2,848,608 | Nienburg | Aug. 19, 1958 |
| 2,860,259 | Odell et al. | Nov. 11, 1958 |
| 2,935,255 | Reiner | May 3, 1960 |